(12) United States Patent
Williams et al.

(10) Patent No.: US 6,633,327 B1
(45) Date of Patent: Oct. 14, 2003

(54) RADIATION PROTECTION INTEGRATED MONITORING SYSTEM

(75) Inventors: Don Ronald Williams, Lynchburg, VA (US); Scot Rodney Wilson, Forest, VA (US); Gerald Stewart Burk, Forest, VA (US); Clifford John Maunz, Lynchburg, VA (US)

(73) Assignee: Framatome ANP, Inc., Lynchburg, VA (US)

( * ) Notice: Subject to any disclaimer, the term of this patent is extended or adjusted under 35 U.S.C. 154(b) by 0 days.

(21) Appl. No.: 09/151,009

(22) Filed: Sep. 10, 1998

(51) Int. Cl.[7] .......................... H04N 9/47; H04N 5/225; G06K 9/00
(52) U.S. Cl. .......................... 348/82; 348/169; 382/141
(58) Field of Search .............................. 348/82, 83, 81, 348/84, 85, 86, 90, 61, 169, 197, 159; 382/144, 145–151, 141; 345/435; 250/473, 363.1, 253; 356/121, 620; 700/83, 282; 374/124; 359/137; 434/262; 340/573.1, 539

(56) References Cited

U.S. PATENT DOCUMENTS

| 3,894,804 A | | 7/1975 | Detwiler et al. ............. 356/121 |
|---|---|---|---|
| 4,831,616 A | * | 5/1989 | Huber ......................... 359/137 |
| 5,219,226 A | * | 6/1993 | James ......................... 374/124 |
| 5,286,973 A | * | 2/1994 | Westrom et al. ............. 250/253 |
| 5,446,548 A | | 8/1995 | Gerig et al. ................ 356/375 |
| 5,519,638 A | * | 5/1996 | Tiao ............................ 700/287 |
| 5,591,976 A | | 1/1997 | Berthold et al. .......... 250/363.1 |
| 5,637,876 A | | 6/1997 | Donahue et al. .......... 351/474.1 |
| 5,648,897 A | * | 7/1997 | Johnson et al. ................ 700/83 |
| 5,882,206 A | * | 3/1999 | Gillio ............................ 434/262 |
| 5,923,364 A | * | 7/1999 | Rhodes et al. ............... 348/159 |
| 6,031,454 A | * | 2/2000 | Lovejoy et al. .............. 340/539 |
| 6,166,744 A | * | 12/2000 | Jaszlicks et al. ............. 345/435 |
| 6,198,394 B1 | * | 3/2001 | Jacobsen et al. .......... 340/573.1 |

* cited by examiner

*Primary Examiner*—Gims S. Philippe
(74) *Attorney, Agent, or Firm*—MacCord Mason PLLC

(57) ABSTRACT

An environmental monitoring system for a hazardous work area, such as a nuclear power plant, which monitors the radiation exposure of personnel working in the nuclear power plant and overlays a visual representation of the exposure data onto a video display of the location the personnel are working in. The apparatus includes a video source, such as a plurality of PTZ cameras, for providing video image signals of the work area. In the preferred embodiment, individual radiation exposure sensors provide signals representative of the radiation received by each worker in the work area. A computer, outside of the work area, is connected to the sensors for converting the sensor signals to a visual video representation of the sensor measurements. A gen/lock overlay unit is connected to the computer for combining the video image signals and the visual video representation of the sensor measurements wherein the visual video representations are overlaid onto the video images of the work area. In the preferred embodiment, a remote relay unit first receives the video image signals and the sensor signals adjacent to the work area and relays the video image signals and the sensor signals to the computer and the gen/lock overlay unit outside the work area through a fiber optic cable.

36 Claims, 1 Drawing Sheet

RADIATION PROTECTION INTEGRATED MONITORING SYSTEM

BACKGROUND OF THE INVENTION (1) Field of the Invention

The present invention relates generally to environmental monitoring systems and, more particularly, to a system for monitoring radiation exposure of personnel working in a nuclear power plant and overlaying a visual representation of the exposure data onto a video display of the location the personnel are working in.

(2) Description of the Prior Art

Maintenance activities at nuclear power plants require accurate radiological controls to keep personnel radiation dose As Low As Reasonably Achievable (ALARA). Specifically, information regarding the amount of radiation to which workers are exposed, i.e. radiation dosimetry information, must be measured and monitored by Radiation Protection (RP) personnel. RP personnel are also required to maintain continuous visual and audio contact with workers in high radiation areas. In the past, RP personnel working near the actual monitored tasks provided coverage for such radiological control activities. However, this often caused unavoidable exposure to the RP personnel in the work area and there has been a movement in the industry to remote monitoring of radiation exposure.

Conventionally, dosimetry information is displayed on one monitor while a real time video image of the work area being monitored is displayed on another monitor. Thus, to maintain visual contact with the workers and to monitor continuously the dosimetry information, multiple RP personnel are required. Moreover, a single RP worker cannot continuously monitor the radiation dosimetry information and maintain constant visual contact with the workers being monitored without looking back and forth between the separate displays for each area being monitored. As a result, RP personnel could overlook important dosimetry information while monitoring the real time video image or fail to notice significant changes in radiological conditions or operator errors while monitoring the dosimetry information.

Thus, there remains a need for a new and improved apparatus for integrating the display of radiation dosimetry information with the display of real time video images which permits viewing on a single video display the video images of the work areas being visually monitored and, at the same time, the radiation dosimetry information relating to specific personnel working in the monitored area.

SUMMARY OF THE INVENTION

The present invention is directed to an environmental monitoring system for a hazardous work area, such as a nuclear power plant, which monitors the radiation exposure of personnel working in the nuclear power plant and overlays a visual representation of the exposure data onto a video display of the location the personnel are working in.

The apparatus includes a video source, such as a plurality of PTZ cameras, for providing video image signals of the work area. In the preferred embodiment, individual radiation exposure sensors provide signals representative of the radiation received by each worker in the work area. A computer, outside of the work area, is connected to the sensors for converting the sensor signals to a visual video representation of the sensor measurements. A gen/lock overlay unit is connected to the computer for combining the video image signals and the visual video representation of the sensor measurements. Specifically, the visual video representations are overlaid onto the video images of the work area.

In the preferred embodiment, a remote relay unit first receives the video image signals and the sensor signals adjacent to the work area and relays the video image signals and the sensor signals to the computer and the gen/lock overlay unit outside the work area through a fiber optic cable. The remote relay unit includes electo-optical transmitters for receiving the video image signals and converting the video image signals to optical video image signals. Additional electro-optical transceivers receive the sensor signals and convert the sensor signals to optical sensor signals. A fiber optical cable is connected between the remote relay unit and the computer and gen/lock overlay unit for transmitting the optical video image signals and the optical sensor signals from the remote relay unit.

Also, in the preferred embodiment, a screen splitter is connected between the computer and the gen/lock overlay unit for separating the visual representation of the sensor measurements into a separate video signal from the computer user interface video signal. A video display is connected to the gen/lock overlay unit for displaying the visual video representation overlaid onto the video images of the work area Accordingly, one aspect of the present invention is to provide an environmental monitoring system for a hazardous work area. The apparatus includes: (a) a video source for providing a video image signal of the work area; (b) a sensor for providing a signal representative of a measurement of at least one predetermined parameter in the work area; and (c) a gen/lock overlay unit connected to the video source and the sensor for converting the sensor signal to a visual video representation of the sensor measurement and for combining the video image signal and the visual video representation, wherein the visual video representation is overlaid onto the video image of the work area.

Another aspect of the present invention is to provide a video overlay unit for an environmental monitoring system for a hazardous work area having a video source for providing a video image signal of the work area and a sensor for providing a signal representative of a measurement of at least one predetermined parameter in the work area. The apparatus includes: (a) a computer connected to the sensor for converting the sensor signal to a visual video representation of the sensor measurement; and (b) a gen/lock overlay unit connected to the computer for combining the video image signal and the visual video representation of the sensor measurement, wherein the visual video representation is overlaid onto the video image of the work area.

Still another aspect of the present invention is to provide an environmental monitoring system for a hazardous work area. The apparatus includes: (a) a video source for providing a video image signal of the work area; (b) a sensor for providing a signal representative of a measurement of at least one predetermined parameter in the work area; (c) a computer connected to the sensor for converting the sensor signal to a visual video representation of the sensor measurement; (d) a gen/lock overlay unit connected to the computer for combining the video image signal and the visual video representation of the sensor measurement, wherein the visual video representation is overlaid onto the video image of the work area; and (e) a remote relay unit for receiving the video image signal and the sensor signal adjacent to the work area and relaying the video image signal and the sensor signal to the computer and the gen/lock overlay unit outside the work area.

These and other aspects of the present invention will become apparent to those skilled in the art after a reading of the following description of the preferred embodiment when considered with the drawings.

DESCRIPTION OF THE PREFERRED EMBODIMENTS

Figure 1:
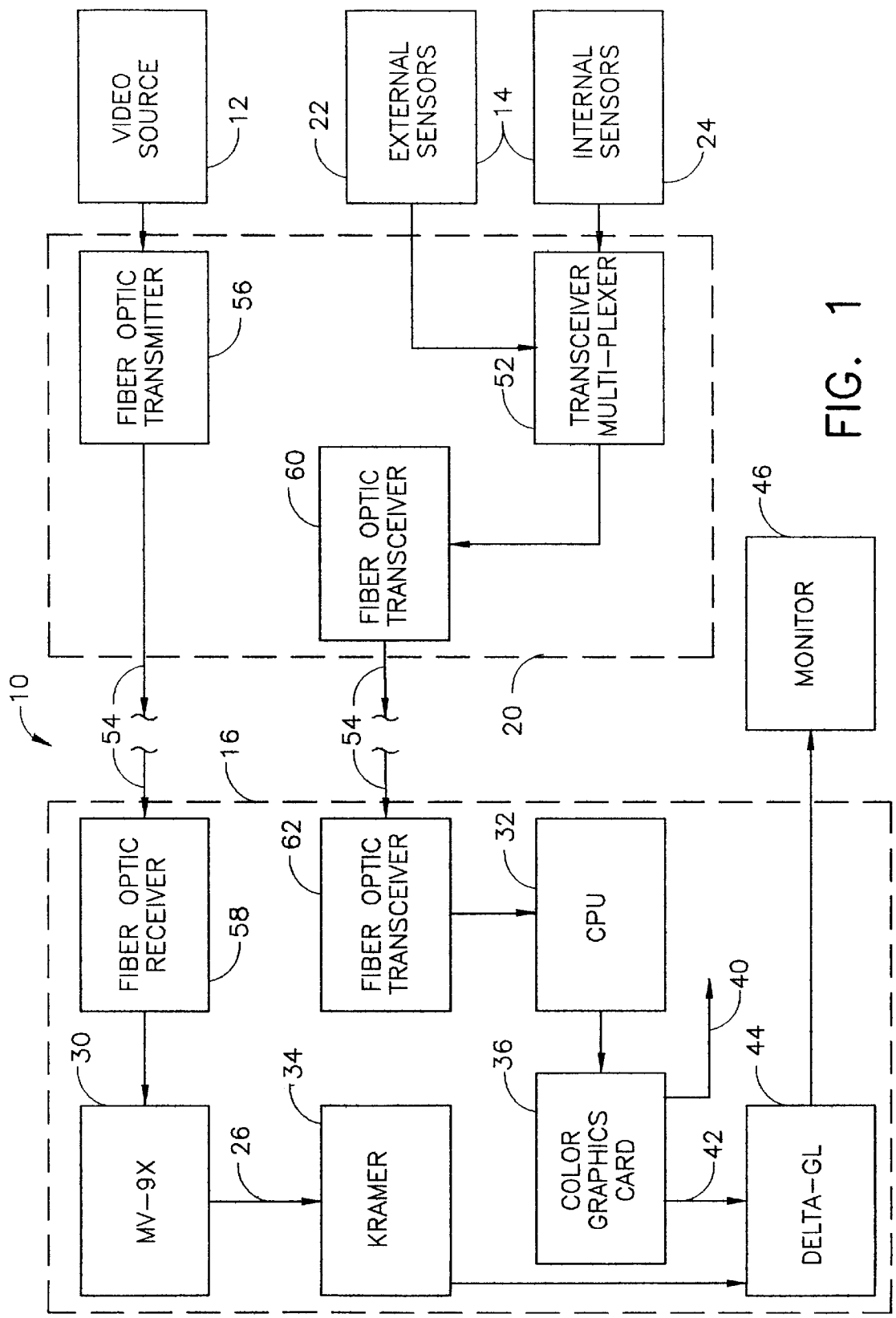
FIG. 1 is a block diagram illustrating a radiation protection integrated monitoring system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an environmental monitoring system, generally designated 10, is shown constructed according to the present invention. The environmental monitoring system 10 is comprised of a video source 12, a sensor 14, a gen/lock overlay unit 16, and a remote relay unit 20.

The preferred video source 12 is a video camera, which transmits a real time video signal. Alternatively, the video source 12 may be a video recorder, which produces a recorded video signal useful for simulation training, or another device capable of transmitting a video signal, either in real time or recorded. In the preferred embodiment, the video camera is capable of remotely controlled panning, tilting and zooming (PTZ).

In the preferred embodiment, the sensor 14 is an external parameter sensor 22 that measures radiation dosimetry wirelessly. A suitable example of such a wireless radiation dosimetry sensor is a Merlin-Gerin Model DMC-100, available from MGP, of Smyrna, Ga. The external parameter sensor may also measure other environmental conditions such as temperature, air pressure, humidity, concentrations and compositions of gases, air quality and light.

Alternatively, the sensor 12 may be an internal parameter sensor 24 that measures other internal conditions, such as a person's body temperature, pulse, blood pressure and brain activity. Similarly, the sensor could be used to monitor temperature, flow, pressure, etc. in closed systems. In the preferred embodiment, the sensor 14 is bidirectional which permits communication both to the sensor as well as receiving data.

The gen/lock overlay unit 16 comprises at least one video input signal 26, a visual representation 32 of the sensor 14 output, a means 44 for combining the video input signal 26 and the visual representation 32 of the sensor output signal, and a video display 46.

In the preferred embodiment, the video input signal 26 is generated by a video multiplexer 30, which permits the display of a plurality of cameras either in order, or several selected at one time. A suitable example of a video multiplexer is a Model MV-96, available from Robot, Inc., of San Diego, Calif.

Also in the preferred embodiment, the visual representation 32 of the sensor 14 output is first received by a screen splitter 36, which splits the visual representation signal into a graphical user interface signal 40 and a data overlay signal 42. This allows these two different functions to then be displayed separately and at higher resolution on, for example two 20 inch monitors, than could be done on a single monitor unless the monitor was much larger. In order to further improve the resolution of the visual representation 32 of the sensor 14 output, the separated video signal is converted to a high resolution S-VHS signal 34. The combining means 44 combines the video input signal 26, and the data overlay signal 42 and displays the combined signal on a video display 46.

The relay unit 20 is comprised of first converter 50 for converting the video output signal from the video source 12 from an electrical signal to an optical signal, and a second converter 52 for converting the output signal from the sensor 14 from an electrical signal to an optical signal. The relay unit may further include a fiber optic coupler 56 for coupling the converted optical signal from the video source 12 with the converted optical signal from the sensor 14. The gen/lock overlay unit includes a corresponding fiber optic decoupler 58. In the preferred embodiment, the fiber optic coupler 56 and the fiber optic decoupler are wave division multipliers (WDM) devices. A fiber optic cable 54 connects the fiber optic coupler 56 to the second optic decoupler 58 for transmitting the converted video source 12 output signal and the converted sensor 14 output signal from the relay unit 20 to the gen/lock overlay unit 16.

In operation, the video source 12 sends an electronic video signal to the first converter 50, which converts the electronic video signal to an optical video signal. Simultaneously, the sensor 14 transmits an electronic signal representing radiation dosimetry information to the second converter 52, which converts the electronic radiation dosimetry signal to an optical radiation dosimetry signal. The fiber optic coupler 56 couples the optical video signal and the optical radiation dosimetry signal, and the coupled optical signal is transmitted over fiber optic cable 54 from the relay unit 20 to the gen/lock overlay unit 16.

The coupled optical signal is received by the fiber optic decoupler 58, which decouples the coupled optical signal resulting in separate optical signals for the video image and the dosimetry information which, in turn, are converted back to video signals.

The signals for the video images are transmitted to the video muliplexer 30, which is programmed to selectively display various camera views. The video image signal is then transmitted to the combining means 36 where the video image signal will be combined with the radiation dosimetry signal for displaying on a single monitor.

Simultaneously, the signal for the radiation dosimetry information is sent to a computer 32, which creates a visual representation of the radiation dosimetry signal first. The video signal from the computer is received by a screen splitter 36, which splits the visual representation signal into the graphical user interface signal and the data overlay signal thereby allowing these two different functions to then be displayed separately. The separated video signal is converted to a high resolution S-VHS signal. The combining means 44 combines the video input signal 26, and the data overlay signal 42 and displays the combined signal on a video display 46 which displays both the video image signal and the visually represented radiation dosimetry information signal simultaneously.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An environmental monitoring system for monitoring workers in a hazardous work area, said apparatus comprising:
   (a) a video source for providing a video image signal of said workers in the work area;
   (b) individual sensors for said workers in the work area remote from said video source for providing a signal representative of a measurement of at least one predetermined parameter for said workers in the work area;
   (c) a gen/lock overlay unit connected to said video source and said individual sensors for converting said sensor signal from said individual sensors to a visual video representation of said sensor measurement and for combining said video image signal and said visual video representation, wherein said visual video representation is overlaid onto said video image of the work area; and
   (d) a video display connected to said gen/lock overlay unit for displaying said visual video representation overlaid onto said video image of the work area.

2. The apparatus according to claim 1, further including a remote relay unit for receiving said video image signal and said sensor signal adjacent to the work area and relaying said video image signal and said sensor signal to said gen/lock overlay unit outside the work area.

3. The apparatus according to claim 2, wherein said remote relay unit includes at least one electo-optical transmitter for receiving said video image signal and converting said video image signal to an optical video image signal; at least one electro-optical transceiver for receiving said sensor signal and converting said sensor signal to an optical sensor signal; and a fiber optical cable connected between said remote relay unit and said gen/lock overlay unit for transmitting said optical video image signal and said optical sensor signal from said remote relay unit to said gen/lock overlay unit.

4. The apparatus according to claim 3, further including a fiber optic coupler connected between said electro-optical transceivers and said fiber optical cable for combining said optical video image signal and said optical sensor signal into a multiplexed optical video image and sensor signal.

5. The apparatus according to claim 4, wherein said fiber optic coupler is a wave division multiplier.

6. The apparatus according to claim 4, further including a fiber optic decoupler connected between said fiber optical cable and said gen/lock overlay unit for separating said multiplexed optical video image and sensor signal back into an optical video image signal and an optical sensor signal.

7. The apparatus according to claim 1, wherein said video source is at least one video camera.

8. The apparatus according to claim 7, wherein said video camera is a remotely controlled PTZ camera.

9. The apparatus according to claim 1, wherein said video source is a pre-recorded video for providing a simulated event.

10. The apparatus according to claim 1, wherein said sensor for providing a signal representative of a measurement of at least one predetermined parameter in the work area measures an external parameter in the work area.

11. The apparatus according to claim 10, wherein said sensor is a personnel radiation monitor.

12. The apparatus according to claim 11, wherein said radiation monitor is wireless.

13. The apparatus according to claim 1, wherein said sensor for providing a signal representative of a measurement of at least one predetermined parameter in the work area measures an internal parameter in the work area.

14. The apparatus according to claim 13, wherein said sensor is a personnel heart rate monitor.

15. The apparatus according to claim 1, wherein said sensor for providing a signal representative of a measurement of at least one predetermined parameter in the work area is a bi-directional sensor.

16. A video overlay unit for an environmental monitoring system for monitoring workers in a hazardous work area having a video source for providing a video image signal of said workers in the work area and individual sensors for said workers in the work area remote from said video source for providing a signal representative of a measurement of at least one predetermined parameter for said workers in the work area, said apparatus comprising:
   (a) a computer connected to said individual sensors for converting said signal from said individual sensors to a visual video representation of said sensor measurement;
   (b) a gen/lock overlay unit connected to said computer for combining said video image signal and said visual video representation of said sensor measurement, wherein said visual video representation is overlaid onto said video image of the work area;
   (c) a screen splitter connected between said computer and said gen/lock overlay unit for splitting the visual representation signal into a graphical user interface signal and a data overlay signal; and
   (d) a video display connected to said gen/lock overlay unit for displaying said visual video representation overlaid onto said video image of the work area.

17. The apparatus according to claim 16, wherein said video source includes a video multiplexer for providing video input from a plurality of video sources.

18. The apparatus according to claim 16, wherein said visual video representation is an S-video signal.

19. The apparatus according to claim 16, wherein said visual video representation is selected from the group consisting of text, graphs and colors.

20. An environmental monitoring system for monitoring workers in a hazardous work area, said apparatus comprising:
   (a) a video source for providing a video image signal of said workers in the work area;
   (b) individual sensors for said workers in the work area remote from said video source for providing a signal representative of a measurement of at least one predetermined parameter for said workers in the work area;
   (c) a computer connected to said individual sensors for converting said sensor signal from said individual sensors to a visual video representation of said sensor measurement;
   (d) a gen/lock overlay unit connected to said computer for combining said video image signal and said visual video representation of said sensor measurement, wherein said visual video representation is overlaid onto said video image of the work area;
   (e) a remote relay unit for receiving said video image signal and said sensor signal adjacent to the work area and relaying said video image signal and said sensor signal to said computer and said gen/lock overlay unit outside the work area;
   (f) a screen splitter connected between said computer and said gen/lock overlay unit for splitting the visual representation signal into a graphical user interface signal and a data overlay signal; and (g) a video display connected to said gen/lock overlay unit for displaying said visual video representation overlaid onto said video image of the work area.

21. The apparatus according to claim 20, wherein said remote relay unit includes at least one electo-optical transmitter for receiving said video image signal and converting said video image signal to an optical video image signal; at least one electro-optical transceiver for receiving said sensor signal and converting said sensor signal to an optical sensor signal; and a fiber optical cable connected between said remote relay unit and said gen/lock overlay unit for transmitting said optical video image signal and said optical sensor signal from said remote relay unit to said gen/lock overlay unit.

22. The apparatus according to claim 21, further including a fiber optic coupler connected between said electro-optical converters and said fiber optical cable for combining said optical video image signal and said optical sensor signal into a multiplexed optical video image and sensor signal.

23. The apparatus according to claim 22, wherein said fiber optic coupler is a wave division multiplier.

24. The apparatus according to claim 22, further including a fiber optic decoupler connected between said fiber optical cable and said gen/lock overlay unit for separating said multiplexed optical video image and sensor signal back into an optical video image signal and an optical sensor signal.

25. The apparatus according to claim 22, wherein said video source is at least one video camera.

26. The apparatus according to claim 25, wherein said video camera is a remotely controlled PTZ camera.

27. The apparatus according to claim 22, wherein said video source is a pre-recorded video for providing a simulated event.

28. The apparatus according to claim 20, wherein said sensor for providing a signal representative of a measurement of at least one predetermined parameter in the work area measures an external parameter in the work area.

29. The apparatus according to claim 28, wherein said sensor is a personnel radiation monitor.

30. The apparatus according to claim 29, wherein said radiation monitor is wireless.

31. The apparatus according to claim 20, wherein said sensor for providing a signal representative of a measurement of at least one predetermined parameter in the work area measures an internal parameter in the work area.

32. The apparatus according to claim 31, wherein said sensor is a personnel heart rate monitor.

33. The apparatus according to claim 20, wherein said sensor for providing a signal representative of a measurement of at least one predetermined parameter in the work area is a bi-directional sensor.

34. The apparatus according to claim 20, wherein said video source includes a video multiplexer for providing video input from a plurality of video sources.

35. The apparatus according to claim 20, wherein said visual video representation is an S-video signal.

36. The apparatus according to claim 20, wherein said visual video representation is selected from the group consisting of text, graphs and colors.

* * * * *